United States Patent [19]

Meyer

[11] Patent Number: 5,458,400
[45] Date of Patent: Oct. 17, 1995

[54] METHOD OF MANUFACTURING OF BRUSHES, IN PARTICULAR, TOOTH BRUSHES

[75] Inventor: Berthold Meyer, Neustadt, Germany

[73] Assignee: M+C Schiffer GmbH, Neustadt, Germany

[21] Appl. No.: 224,023

[22] Filed: Apr. 6, 1994

[30] Foreign Application Priority Data

Apr. 6, 1993 [DE] Germany ............... 43 11 186.6

[51] Int. Cl.[6] ................ A46D 1/08; A46D 3/00
[52] U.S. Cl. ................ 300/21; 300/8; 264/243
[58] Field of Search ............ 300/21, 2, 8; 264/243

[56] References Cited

U.S. PATENT DOCUMENTS

| | | | |
|---|---|---|---|
| 3,026,146 | 3/1962 | Szabo et al. | 300/21 |
| 4,635,313 | 1/1987 | Fassler et al. | 15/193 |
| 5,143,424 | 9/1992 | Boucherie | 300/2 |
| 5,158,342 | 10/1992 | Pai | 300/21 |
| 5,350,219 | 9/1994 | Shou-Jen | 300/21 |

FOREIGN PATENT DOCUMENTS 845933  6/1953  Germany .

Primary Examiner—Irene Cuda
Assistant Examiner—John M. Husar
Attorney, Agent, or Firm—Anderson Kill Olick & Oshinsky

[57] ABSTRACT

The method of manufacturing brushes, in particular, tooth brushes, includes injection molding of the brush body, together with the brush head having a plurality of openings for receiving bristle bundles and a recess defining a back surface of the brush head, inserting into the opening finished bristle bundles and fusing the ends of the bristle bundles projecting from the back surface of the brush head, and filling thereafter the brush head recess with a plastic material.

11 Claims, 1 Drawing Sheet

METHOD OF MANUFACTURING OF BRUSHES, IN PARTICULAR, TOOTH BRUSHES

BACKGROUND OF THE INVENTION

The invention relates to a method of manufacturing of brushes, in particular, tooth brushes having a body, which is formed by injection molding, with a head portion having a plurality of through-openings and a back side recess extending over all of the openings and with bristle bundles inserted into the openings.

When the tooth brushes are manufactured, conventionally a handle connected with the brush head by the brush neck is also injection molded in an appropriately designed mold, with the head being subsequently provided with bristle bundles. For providing the brush head with bristle bundles, it is known to form during injection molding of the brush head, bristle bundle receiving openings therein in the form of blind holes. The number of openings corresponds to the number of bristle bundles to be received therein.

To secure the bristle bundles in the openings, the separate bristle bundles are removed, by a suitable device, from a stack of bristle bundles, are creased and then are stuffed into the respective openings in the brush head. The creasing is effected in a special anchor formed of a suitable metal. The width of the anchor is slightly greater than the cross-section of a bristle bundle. This results in that the ends of the anchor, which project beyond the bristle bundle are pressed into the head material radially of the head openings. To this end, relatively small slots are formed in the bristle receiving surface of the head, which are almost invisible by a naked eye and which can be made without much difficulty. However, these metal anchors adversely affect recycling properties of tooth brushes. Because of the metal anchor, the brush head cannot be economically processed for further use.

For reusing of the tooth brush material, the brush head with bristles should be separated, and only the material of the tooth brush handle and neck, are suitable for further use. The brush heads with the bristles are thrown away into a waste dump.

U.S. Pat. No. 3,604,043 discloses a method of manufacturing brushes in which bristle bundles are removed from a container and then are welded at their fastening ends which take a particular shape. Finally, the finished bristle bundles are inserted into blind holes, which are formed in the brush head and are enlarged at their inner end. The fastening end of bristle bundles is so deformed that they are reliably held in the brush body. However, this method is relatively expensive, and it is difficult to enlarge a blind hole.

According to another method of manufacturing tooth brushes, bristle bundles, which are cut to a predetermined length, are inserted into respective channels of a metal plate-like carrier, with their fastening ends being subsequently fused to form thickenings thereat. Then the carrier, with the bristle bundles secured thereto, is placed in a special device against already fused bristle receiving surface of a tooth brush having a brush head, neck and handle. The carrier provides that only the thickenings of the fastening ends of the bristle bundles are received within the fused bristle receiving surface.

After the cooling of the fused bristle receiving surface, the bristle bundles are secured to the brush head. A tooth brush produced by the above-described method is completely recycleable. However, the drawback of this method consists in that during insertion of the thickenings of the fastening ends of the bristle bundles into the fused bristle receiving surface, material accumulation around the bristle bundles takes place, which adversely affect the optical impression such a tooth brush produces.

A similar method is disclosed in German patent No. 845,933. However, in the German patent, the carrier for receiving the cut-off bristle bundles is formed as a mold half which, after being equipped with the bristle bundles and the formation of thickenings, is assembled at its fastening end surface, with another mold half to form an injection mold in which the tooth brush handle is formed, simultaneously with the attachment of the bristle bundles to the brush head. With this method, the mold half that produces openings in the brush head is not used during the attachment of the bristle bundles to the brush head and is inverted.

The prior art also discloses a method of manufacturing of a tooth brush from a thermoplastic material according to which, a first part of the brush head having through openings, is formed in a first injection molding step. Then, the bristle bundles are inserted into the through-openings in the formed brush head part in an injection mold, with the active ends being appropriately shaped and the inner ends being fused. Fusing of the inner ends of the bristle bundles insures their attachment to the first brush head part.

Then, a second part of the brush head is formed in a second injection molding step, in which the first part is molded with the second injection-molded part, which covers the inner ends of the bristle bundles. The drawback of this method consists in that the attachment of the bristle bundles to the brush head in the injection mold increases the production cycle time.

The rounding off of the end of the bristle bundles by grinding with this method is practically excluded because it would require insertion of a grinding head into the injection mold, which would adversely affect the quality of the tooth brush. Accordingly, one object of the invention is a method of manufacturing brushes in particular, tooth brushes, and which would result in producing of recycleable brushes and with a shortened cycle time.

Another object of the invention is a method of manufacturing brushes which would permit insertion of both creased bristle bundles and bristle cut-off section.

SUMMARY OF THE INVENTION

These and other objects of the invention, which will become apparent hereinafter, are achieved by providing a method according to which an injection-molded brush body, with a head having through-openings for receiving the bristle bundles and a recess on a back side thereof, is transferred to a separate bristle insertion station, at which the finished bristle bundles are inserted and fused at their inner ends. Thereafter, the brush, equipped with bristles, is transferred to another mold in which the recess on the back side of the brush head is filled with a plastic material.

The method, according to the present invention, permits to obtain recycleable tooth brushes and in a short production cycle time. The inventive method also permits to insert bristle bundles, produced in conventional bristle machines, without use of a metal anchors. At that, the conventional molds for producing brush bodies require only small modification. On the other side, conventional bristle bundles can be inserted into the through-openings of a brush head.

The inserted bristle bundles can, if needed, be appropriately shaped in the brush head at their active ends, without the use of a carrier plate. The thickenings of the inner ends can be effected by fusing before or after shaping of the active ends. The attachment devices can be used for any type of the bristle handles. In addition, it is possible to round-off or to grind the active side ends of the bristle bundles separately, after they have been inserted into the brush head, without any danger connected with the insertion of the required tools into the injection mold.

BRIEF DESCRIPTION OF THE DRAWINGS

The features and objects of the present invention will become more apparent and the invention itself will be best understood from the following detailed description of the preferred embodiment when read with references to the accompanying drawings, wherein.

DETAILED DESCRIPTION OF THE PREFERRED EMBODIMENTS

Figure 1:
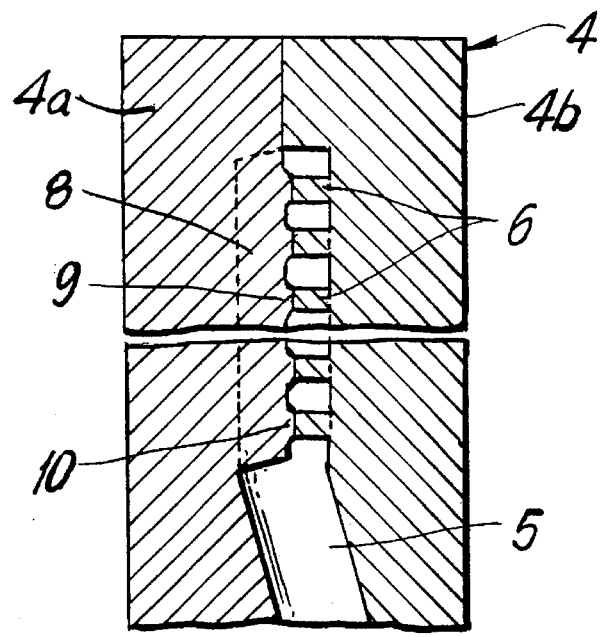
FIG. 1 is a cross-sectional view of a mold for manufacturing brush bodies.

A brush 1, in particular, a tooth brush, produced according to the present invention, consists generally of a brush head 2, brush neck 3, and a handle which is connected to the brush neck and which, for simplicity sake, is not shown in the drawings. The brush 1 is produced by injection molding from a suitable plastic material in a mold 4, which comprises two parts, 4a and 4b. The mold 4 in an assembled condition thereof has a mold cavity 5 the shape of which corresponds to the shape of the finished body of the tooth brush 1. In FIG. 1, for simplicity sake, only that portion of the cavity 5 of the mold 4 is shown which serves for forming the brush head 2 and the brush neck 3.

In the region of the brush head, the part 4b of the mold 4 has a plurality of pins 6, which correspond in number to the number of bristle bundles 7 to be arranged in the brush head 2 and the position of which corresponds to the position of bristle bundles 7 in the brush head 2. The length of the pins 6 is so selected that they would penetrate through the thickness of the wall of the brush head 2. The part 4a is provided with a projecting portion 8 which engages end surfaces 9 of the pins 6 in the assembled condition of the mold 4. In the embodiment of the mold 4 shown in FIG. 1, the end surface of the projecting portion 8 has truncated cone-shaped bosses 10 thereon. The area of the free end surface of each of the bosses 10 exactly corresponds to the area of the free end surface of a respective pin 6. The length and width of the projecting part 8 is so selected that it at least extends over all of the pins 6. In the embodiment of the mold 4 shown in FIG. 1, the width of the projecting part 8 corresponds to the width of the finished brush head 2.

During injection of the plastic material only the mold cavity 5 of the mold 4 is filled, and the body of the brush is manufactured. The body comprises the brush head 2 and the brush neck 3. At that, the wall thickness of the brush head 2 constitutes only a portion of the final thickness of the brush head 2 and is determined by the projecting portion 8 in the part 4a. The pins 6 form in the brush head through-openings 11 for receiving the bristle bundles. The brush openings 11 are provided on the back side of the brush head 2, with chamfers 12, which are formed by bosses 10 of the projecting portion 8 of the mold part 4a.

Naturally, it is also possible to round off the active ends of the separate bristle bundles by grinding or the like. This rounding off is effected, in case when the bristle bundle is shaped, always before the shaping process, that is when all of the utilized ends of the bristles lie in the same plane. The rounding off of the active ends of the bristle bundles and the insertion of the bristle bundles 7 into the openings 11 in the brush head 2 is effected at a separate finishing station, which is located remotely from the mold 4, so that no dust or the like can penetrate in the mold 4.

Only finished bristle bundles 7 are inserted in the openings 11 of the brush head 2. The bristle bundles 7 can be produced, e.g., by creasing, and the creased bristle bundles 7 are inserted into the brush head 2 from the so-called trimming surface 13. It is also possible to use a bristle bundle cut off from a continuous bristle string to a desired length. The bristle bundles 7 advantageously should project somewhat from the back side surface 14 of the brush head 2. The bristle bundles 7 can be shaped in, per se, known manner. The shaping can be effected by applying to the trimming surface 13, of the brush head 2, a negative mold having a profile corresponding to the shape of separate bristle bundles 7. The openings 11 of the brush head 2 have preferably a circular cross-section. However, it is possible to use any suitable cross-section of the openings 11 and to provide in the brush head openings having different cross-sections.

Figure 2:
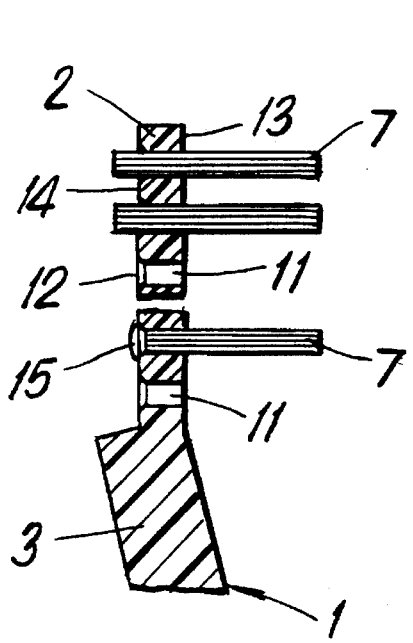
FIG. 2 is a cross-sectional view of a brush body provided with a bundle of bristles.

The bristle bundles 7 project from the trimming side 13 a pre-determined distance and, advantageously, should project from the back side 14 of the brush head 2, as shown in FIG. 2 for two bristle bundles 7. After bristle bundles 7 are inserted into the brush head 7, they are, in per se known manner, deformed so that each bristle bundle 7 has a thickening 15. Forming of the thickenings 15 is facilitated by the chamfers 12 provided in the openings 11, respectively.

Figure 3:
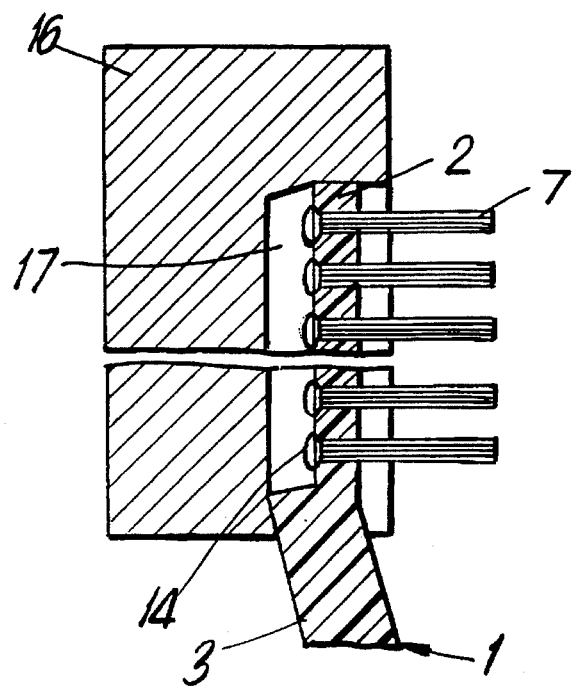
FIG. 3 is a cross-sectional view of another embodiment of a mold used in manufacturing brush bodies.

When all of the bristle bundles 7 are provided, at their attachment ends, with the thickenings 15, respectively, the head 2 of the molded brush 1 is placed into another mold 16, as shown in FIG. 3. The mold 16 has, in the region of the back side surface 14 of the brush head 2, an empty space 17, which is filled with a suitable plastic material after the brush head 2 has been placed therein. The plastic material would cover all of the thickenings 15 of the bristle bundles 7, and the brush head 7 would obtain its final shape.

The plastic material, which is injected into the space 17 may be the same material or be similar to the material from which the body of the brush 1 is molded. However, it is advantageous to use another material for injection into the space 17 of the mold 16. Thus, it is possible to inject into the space 17 a plastic material of another color then the color of the material from which the body of the brush 1 is molded. This would make a tooth brush more attractable from an optical point of view. By using an elastic plastic material, it is possible to provide resilient connection between the brush head 2 and the brush neck 3. To this end, the empty space 17 should extend up to the neck 3. This is achieved by forming the projecting portion 8 of the part 4a of the mold 4, which serves for forming the recess defining the rear side of the brush head 2, such that it extends up to the brush neck 3.

While the present invention was shown and described with reference to a preferred embodiment, various modifications thereof will be apparent to those skilled and, therefore, it is not intended that the present invention be limited to the disclosed embodiment or details thereof, and departures may be made therefrom within the spirit and scope of the appended claims.

What is claimed is:

1. A method of manufacturing brushes including a head portion having a plurality of openings, into which a respective plurality of bristle bundles is inserted, and a recess defining a back surface of the head portion, said method comprising the steps of:

injection molding a brush body, together with the brush head, in a first mold having means for forming the plurality of openings in the brush head for receiving the respective plurality of the bristle bundles, and means for forming the brush head recess;

inserting into the plurality of openings in the brush head the respective plurality of finished bristle bundles, and fusing the ends of the bristle bundles projecting from the back surface of the brush head at a bristle insertion station located separately from the first mold; and thereafter, filling the brush head recess with a plastic material in a second mold.

2. A method as set forth in claim 1, wherein said inserting and fusing step includes predetermined shaping of separate bristle bundles.

3. A method as set forth in claim 1, wherein said inserting step includes rounding off of the separate bristle bundles.

4. A method as set forth in claim 1, wherein said inserting step includes inserting of the finished bristle bundles from a front, trimming surface of the brush head.

5. A method as set forth in claim 1, wherein said inserting step includes inserting of bristle bundles formed by creasing.

6. A method as set forth in claim 1, wherein said inserting step includes directly inserting the bristle bundles into the openings of the brush head.

7. A method as set forth in claim 1, wherein said inserting step includes inserting the bristle bundles into an intermediate plate and, thereafter, inserting the bristle bundles into the openings in the brush head.

8. A method as set forth in claim 1, wherein said step of filling the brush head recess includes filling the recess with a plastic material which is different from the plastic material from which the brush body is molded.

9. A method as set forth in claim 1, wherein said injection molding step includes forming of the brush head recess such that the recess, at least partially, extends to an edge of the brush body.

10. A method as set forth in claim 1, wherein said injection molding process includes forming of the brush head recess such that it extends, at least partially, to a neck of the brush body.

11. A method as set forth in claim 1, wherein said injection molding process includes forming of the brush head recess such that it extends, at least partially, to a handle of the brush body.

* * * * *